UNITED STATES PATENT OFFICE 2,629,985

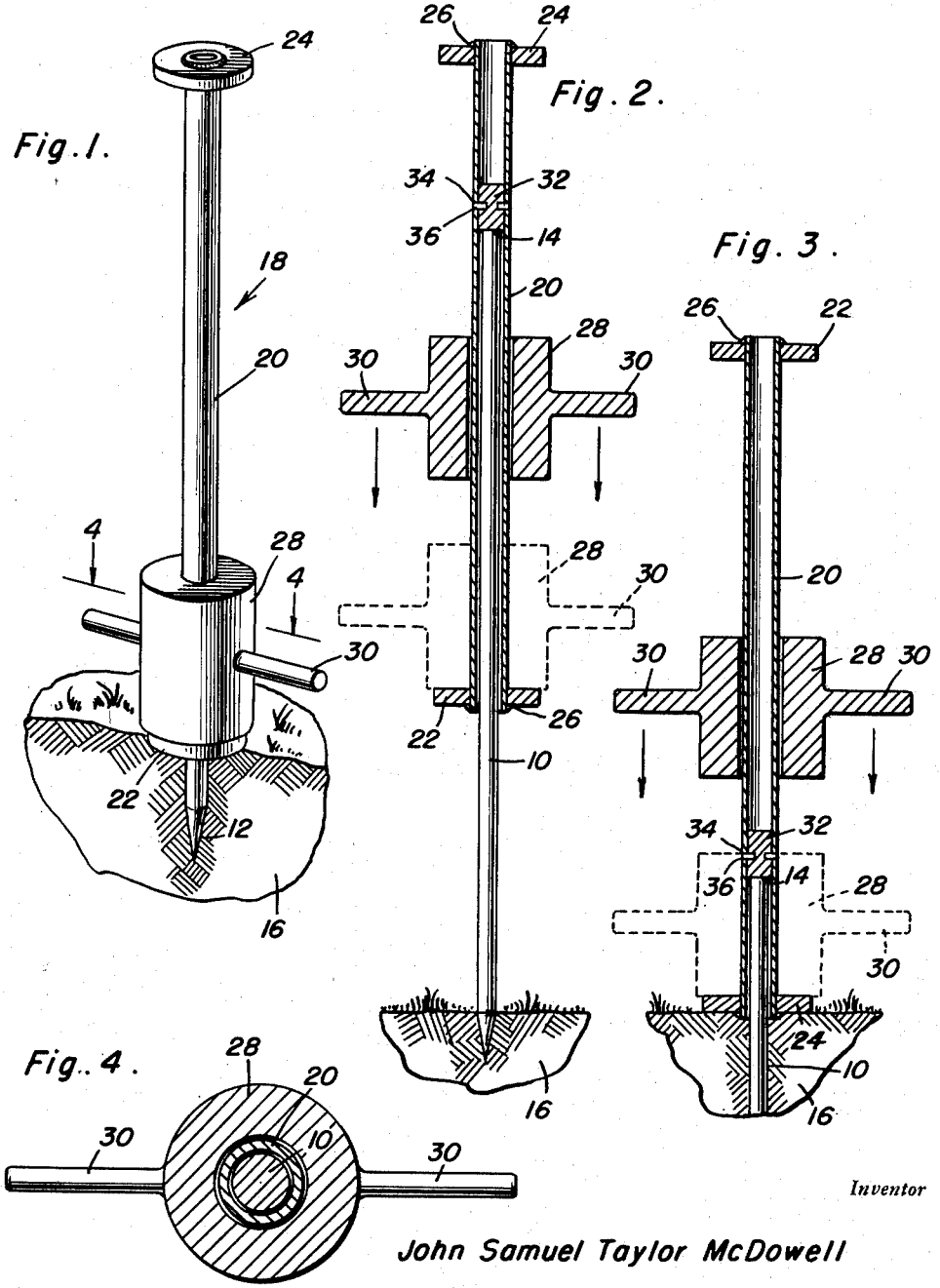

GROUND ROD DRIVER

John Samuel Taylor McDowell, Longview, Tex.

Application April 21, 1949, Serial No. 88,764

1 Claim. (Cl. 61—73)

This invention relates to a manually operable mechanism for driving posts, such as ground rods, into the ground and has for its primary object to obviate the necessity of using ladders upon which the operator must stand to strike the top of the rod and drive the latter into the ground, particularly when the rod is of substantial length.

A further object of this invention is to provide a driver of the character described which is relatively simple in construction and design, easy to assemble and disassemble from the rod or post, and relatively easy to manipulate at an arm level or crouch position.

Another object of this invention is to provide a ground rod driver comprising an elongated shield slidable on the rod, anvil means carried at the free ends of said shield, a manually operable hammer member slidable on said shield between said anvil means, and a driving member frictionally retained within said shield and adapted to abut the top edge of the rod to drive the latter into the ground.

These together with various ancillary objects and features of the invention which will later become apparent as the following description proceeds, are attained by the device, a preferred embodiment of which has been illustrated by way of example only in the accompanying drawings, wherein:

Figure 1 is a perspective view of the device positioned on a ground rod;

Figure 2 is a longitudinal sectional view through the device, the ground rod being shown in elevation and illustrating the position of the driver before the rod is driven into the ground;

Figure 3 is a longitudinal sectional view similar to Figure 2 illustrating the position of the driver after the rod has been driven to the desired depth into the ground; and Figure 4 is a sectional view taken substantially on the plane of section line 4—4 of Figure 1.

Specific reference is now made to the drawings. In the several views in the accompanying drawings and in the following specification similar reference characters indicate corresponding elements throughout.

Indicated generally at 10 is an elongated post, such as a ground rod, having a pointed end 12 at the bottom thereof and a planer end 14 at the top thereof. As will be readily understood, the rod 10 is to be driven into the ground 16 via the pointed end by means of the device of the instant invention generally indicated at 18.

The present driver consists of an elongated metallic shield 20 which is slidably positioned upon the rod and carries at both of its ends anvils, in the form preferably of disks 22 and 24 which are secured in any desired manner to the free ends of the shield 20. As will be seen clearly from the drawings, the free ends of the shield 20 may be inturned as at 26 and the anvil disks 22 and 24 may be welded to these inturned portions.

Between the anvils 22 and 24 a hammer member 28 is slidably received upon the shield 20, and is preferably in the form of a substantially cylindrical body having opposed diametrically extending external handle portions 30. It will be understood that U-shaped suitcase type handles may be substituted for the straight handles to obtain greater driving force.

A driving member 32, in the form preferably of a block, is retained within the shield 20 and is adapted to abut the planer upper end 14 of the rod for driving the latter into the ground. The means for retaining the driving block 32 within the shield consists of drilling holes 34 in the shield and then placing the block in place and electrically welding the block to the shield as shown at 36.

In practical operation, the shield 20 is slidably positioned upon the rod 10 when the latter is in a horizontal position and then the shield and the rod are moved to a vertical position with the pointed end 12 of the rod inserted into the ground. By grasping the handles 30, the operator will move the hammer member 28 downwardly in the direction of the arrows shown in Figures 2 and 3 so that the hammer member strikes the bottom anvil disk 22 moving the shield 20 downwardly on the rod with the driving block 32 striking the upper edge 14 of the rod and driving the rod into the ground. After the rod has been driven a certain depth into the ground the shield is inverted to drive the rod the remaining depth with the hammer striking the anvil disk 24 as shown in Figure 3, the operator moves the hammer member 28 upwardly against the anvil disk 22, whereby the shield 20 is urged off the rod 10.

Thus it will be seen that the driver of the instant invention is of such construction that the rod 10 can be driven into the ground without the necessity of providing a step ladder which must be mounted by the operator in order that the top edge of the rod be struck with a hammer.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is as follows:

A post driver comprising an elongated tubular sleeve having open upper and lower ends, a driving block mounted in said sleeve and dividing the same into upper and lower post receiving sockets, one of said sockets being deeper than the other whereby the sleeve may be reversed to embrace different lengths of a post, anvil disks secured to said sleeve adjacent the ends thereof, and hammer means slidingly mounted on said sleeve for striking said anvil disks, said hammer means comprising a body concentrically surrounding and reciprocable on said sleeve between said anvil disks.

JOHN SAMUEL TAYLOR McDOWELL.

REFERENCES CITED

The following references are of record in the file of this patent:

UNITED STATES PATENTS

| Number | Name | Date |
| --- | --- | --- |
| 52,799 | Winter | Feb. 20, 1866 |
| 1,365,857 | Seder | Jan. 18, 1921 |
| 1,859,398 | Judd | May 24, 1932 |
| 2,067,890 | Collord | Jan. 19, 1937 |